2 Sheets--Sheet 1

ROBERT H. RUSSELL.
Improvement in Combined Rakes and Tedders.
No. 127,370. Patented May 28, 1872.

Witnesses

Inventor:
Robert H. Russell
by his attorneys
Cox° Cox

2 Sheets--Sheet 2.

ROBERT H. RUSSELL.
Improvement in Combined Rakes and Tedders.
No. 127,370. Patented May 28, 1872.

Witnesses.
A. Ruppert,
Wm. G. Henderson

Inventor.
Robert H. Russell
by his attorneys
Cox & Cox 127,370

UNITED STATES PATENT OFFICE.

ROBERT H. RUSSELL, OF LIMA, ASSIGNOR TO JOHN G. SCOTT, OF THORN-BURY, PENNSYLVANIA.

IMPROVEMENT IN COMBINED RAKES AND TEDDERS.

Specification forming part of Letters Patent No. 127,370, dated May 28, 1872.

*To all whom it may concern:*

Be it known that I, ROBERT H. RUSSELL, of Lima, in the county of Delaware and State of Pennsylvania, have made certain new and useful Improvements in Combined Horse Hay-Rakes and Tedders, of which the following is a specification, reference being had to the accompanying drawing.

Nature and Objects of the Invention.

The invention relates to a combination of a horse hay-rake and tedder, which employs an adjustable rake of curved teeth secured to a rake-head, which can be elevated or lowered by means of arms pivoted to the frame of the device and to the rake-head, which is operated by a lever accessible to the driver, the tedder being so constructed that its bars can be folded together, and so arranged that it will either revolve or remain stationary, as desired.

The operations of the device are as follows: The raking operation which is effected by the rake, the prongs of the teeth of the tedder acting to strip the teeth of the rake of any material lodged upon or between them. Second, the spreading operation, which is performed by the tedder, the teeth of the rake acting to remove from the prongs of the teeth of the tedder any lodged material. The tedder and rake thus operate mutually as strippers to each other; otherwise their operations are distinct. Both rake and tedder are adjustable as to elevation by means of a hinged frame, ratchet, and spring, which may be operated by the feet of the driver.

The object of the invention is to provide a device which may be used as a horse hay-rake or as a hay-tedder, thus furnishing a machine to spread the grass when mowed for drying, and when dried collect it into windrows.

Description of the Accompanying Drawing.

Figure 1:
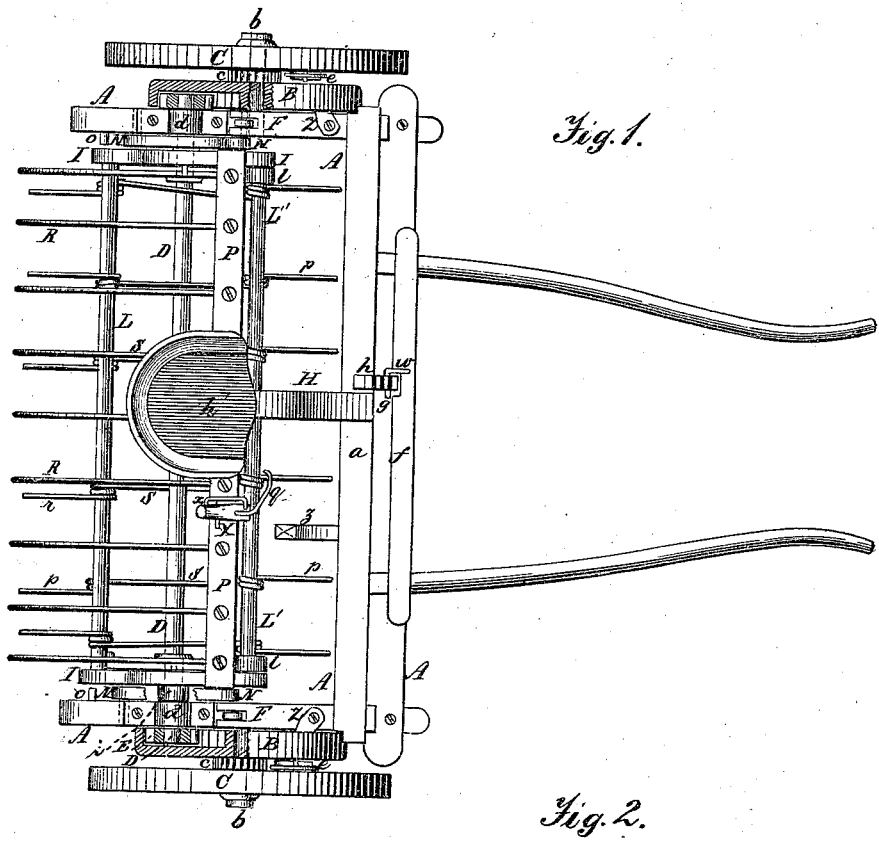
Figure 2:
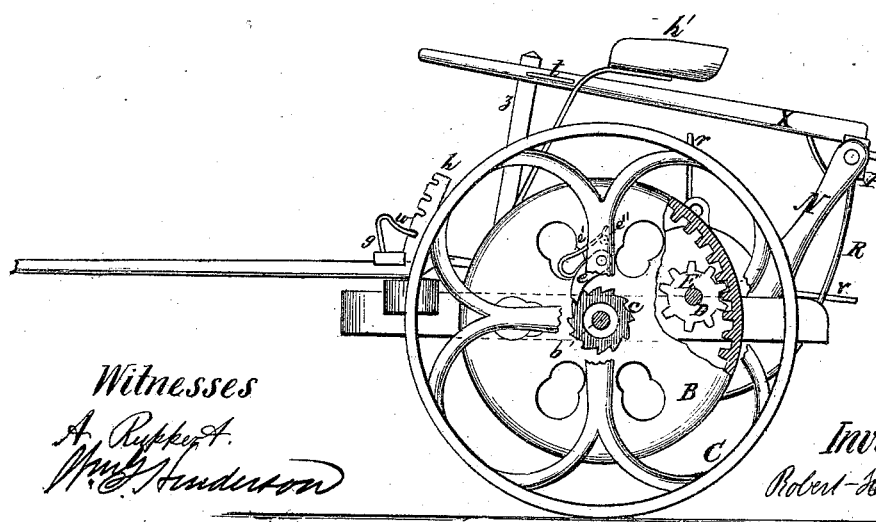
Figure 3:
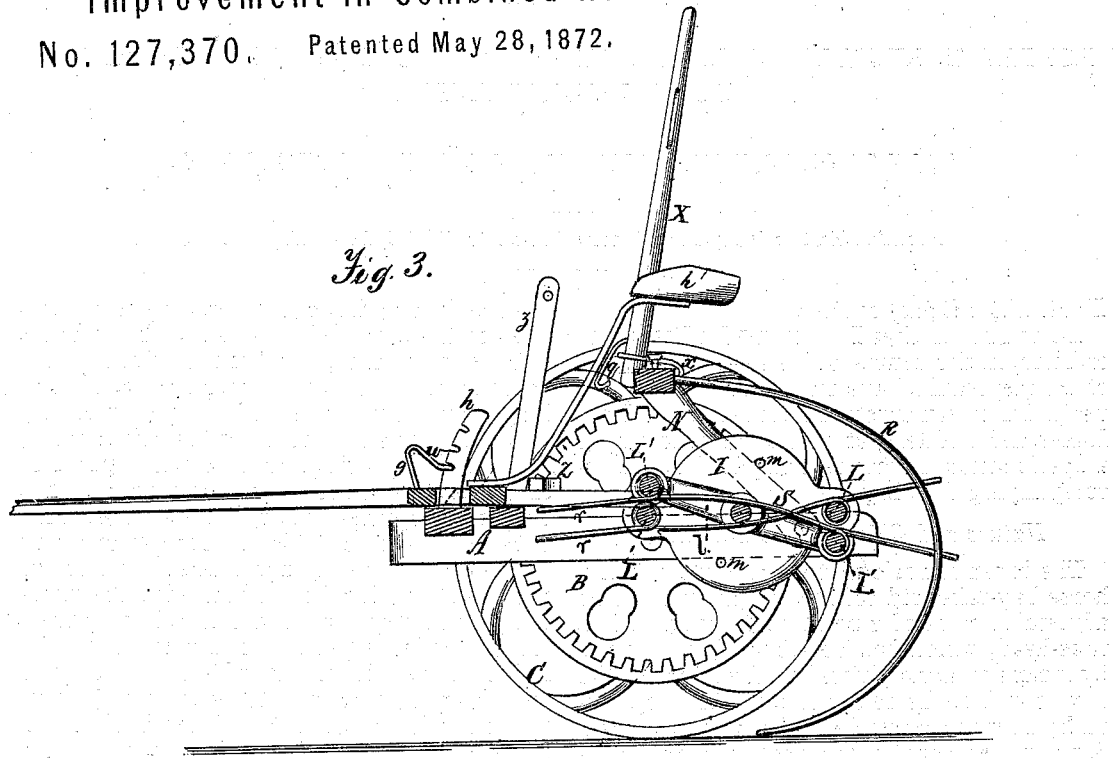
Figure 4:
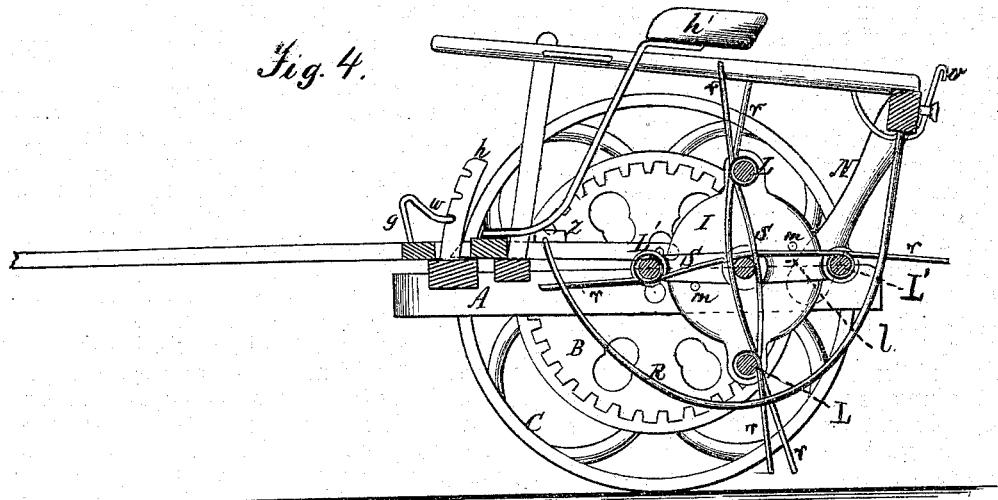

Figure 1 is a plan view of a machine embodying the elements of the invention when arranged for the operation of raking. Fig. 2 is a side elevation of the same, certain parts being broken out to disclose the internal mechanism. Fig. 3 is a vertical central transverse section of the invention when arranged for the operation of raking. Fig. 4 is a similar view of the device arranged for the operation of spreading.

A in the accompanying drawing is a frame open to the rear, and provided with the brace $a$ for strengthening its front portions, which brace is furnished with a standard, $z$, of such length and so placed that its upper extremity is within convenient reach of the driver's seat, said extremity being provided with apertures of proper size to receive the tongue $x$ at the end of the spring-catch $t$, as hereinafter mentioned. The frame A is mounted at or about the center of its sides upon axles $b$, which are provided outside of the frame with the internally-toothed spur-gear wheels B, having their toothed sides adjacent to the sides of the frame A outside of the wheels B. On the axles $b$ are also provided the wheels C, upon which the device is moved. The wheels C and B revolve upon the axles $b$. To the latter wheels are rigidly attached or cast, and having a common center therewith, the ratchet-wheels $c$, the teeth of which are so constructed that when the device is moved forward the spring-pawls $e$, which have a downward pressure and are secured to the inside of the wheels C, engage the teeth of the ratchet-wheels $c$, thus forcing the wheels B, to which the pinions are firmly attached, to revolve in a direction corresponding to the forward movement of the wheels C; or if moved in a contrary direction the pawls pass over the teeth of the ratchet-wheels $c$, thus allowing the wheels C to revolve without affecting the wheels B. The upper part of the sides of the frame A are furnished at a proper point with the journal-boxes $d$, in which the tedder-axle D revolves. The ends of this axle are provided with the pinions E, the teeth of which engage those of the wheels B, thus giving the axle D a movement corresponding to the revolution of the wheels upon the axle $b$. At a point on the upper surface of the sides of the frame A above the axles $b$, the ends of the sides of the swinging frame F are hinged, the front of which is properly provided with thills or pole and cross-brace $f$, to which is secured the angular spring $g$, one end of which is provided with a tongue $w$, which fits into the slots on and projects beyond the side of the curved rack $h$, the base of which is secured to the upper surface of the front of the frame A. It stands vertically between the front edge of the front of the frame F and the brace of the thills, passing through a recess in the rear of the latter. Its position is in close proximity to the foot of the seat standard H, which is secured at the center of the upper surface of the front of the frame F, inclines or curves backward, and is provided with a seat, $h'$, the center of which is about in the same vertical transverse plane with axles $b$. When the frames A and F are in contact the sides of the frame F are provided with the buttons Z, so placed that they may be turned so as to pass between the cogs on the wheels B, and thus check their movement. The tedder-axle D is journaled as aforesaid, and passes on each side inside of the sides of the frame A through and is rigidly secured to the disks or plates I provided on the outside at the point where the axle D passes through them with guards $i$ to prevent the disks coming in contact with any parts of the machine, and to serve as rests for the arms N. At opposite sides of the disk I are attached the ends of the tedder-bars L. The arms $l$ are placed inside of the disks I, the inner surfaces of the disks being in close proximity to the outer surfaces of the arms $l$, which are journaled at their centers upon the axle D, and are of such construction that the radius of the curve made in the movement of their extremities, in which the ends of the tedder-bars L' are secured, corresponds with that of the movement of the extremities of the disks I. The arms $l$ are capable of being moved to such position as to stand at right angles to the vertical plane of the tedder-bars L, their further movement being prevented by the stops $m$ on the inner surfaces of the disks I, which stops may be made of iron studs, cased with gum, or of other infrangible material. The tedder-bars L and L' are equidistant from the axle D, revolve in the same circle, and are secured at each end, respectively, in the disks I and arms $l$, in apertures of such dimensions as to permit the tedder-bar being drawn through them, the bars being secured in such apertures by wood screws or other suitable means. Thus, when it is desired, the bars may be removed by taking out the wood screws on each side and then drawing the bar through either aperture. When desired, the tedder-bars L L' may be folded by turning the arms $l$ so as to bring their extremities in contact with the tedder-bars L, thus placing all of the tedder-bars in close proximity. At proper intervals the tedder-bars L L' are provided with teeth S $r$, which are constructed as follows: The shank S of the tooth is properly coiled around the tedder-bar, leaving the prong $r$ projecting out from the same, which prong $r$ operates as the spreading part of the tooth. The shank S is then passed to the opposite tedder-bar, coiled similarly around it, leaving a similar prong, $r$, standing outward from the bar in a direction opposite to that in which the opposite prong projects. The shanks S between the tedder-bars act as braces, and the shanks connecting opposite tedder-bars should come in contact with the axle D on opposite sides.

The prongs or tedder-teeth $r$ are intended to pass between the rake-teeth. To the inside of the sides of the frame A, a proper distance in rear of the axle D, are pivoted the lower extremities of the swinging arms N on the frame A. In rear of these arms are placed the stops $o$, to prevent the arms swinging too far backward. To the upper extremities of the arms N are journaled the ends of the rake-head P, which is provided with the rake-teeth R properly curved and so placed that when they are thrown forward such of the prongs of the tedder-teeth $r$ as are below the axle D pass between the teeth R. These rake-teeth R are inserted in the rake-head P and have such of their parts as enter the rake-head made flat, or otherwise suitably shaped and secured in position by set-screws. The lever X is hinged to the rake head P on the same side of the driver's seat as the standard Z, a hook, $v$, being attached to the rake-head, by which the lever X can be held in an upright position. The lever X is provided near its handle with the spring-catch $t$, the tongue $x$ of which passes through an aperture in and projects beyond the side of the lever. Near its other extremity the lever has a hook, $q$, which serves to hold it in a depressed position.

*Operation.*

When it is desired to use the machine as a rake and to have the prongs $r$ of the teeth of the tedder act as strippers of the rake-teeth R, the tedder-bars L L' are folded, the pawls $e$ thrown back, and the buttons Z so turned as to pass between the cogs on the wheels B, thus allowing the device to move without affecting the tedder, thereby saving wear upon it. The rake-head P is drawn forward until the arms N come in contact with the guides $i$, which brings the rake-teeth into raking position under the tedder. The lever X is then secured in an upright position to the rake-head P by the hook $v$. The tedder is thus placed in a stationary and almost horizontal position, the prongs $r$ of its teeth on one side projecting backward between the rake-teeth R. When a sufficient quantity of hay is collected on the rake-teeth the lever X is thrown forward, and, as the rake-teeth R are thus elevated, those prongs of the tedder-teeth standing between the rake-teeth R strip them of any lodged material. When it is desired to use the machine as a spreader and to have the rake-teeth R act as strippers of the prongs $r$ of the tedder-teeth, the tedder is unfolded and the buttons Z withdrawn. The lever X, freed from the hook $v$, is then thrown forward and held depressed by the hook $q$ being attached to the rake-head P. The other end of the lever is secured to the standard $z$ by passing the tongue $x$ of the spring-catch $t$ into one of the apertures in the upper part of the standard $z$. This throws the rake-head P downward and forward and secures the rake in a fixed position, bringing the rake-teeth R under the tedder, which, as it revolves, the prongs $r$ of its teeth pass between the rake-teeth R, come in contact with and spread the hay, and, as in rising they pass between the rake-teeth R, are thereby stripped of whatever material may be attached to them. The tedder and rake may be elevated or lowered by placing the tongue $w$ of the angular spring $g$ in a lower or higher one of the slots in the curved rack $h$. From the fact that the frame A operates as a lever to the rear portions of which are attached the raking and spreading mechanisms, the axles $b$ and the wheels C being fulcrums, consequently a depression of the front part produces an elevation of the rear, and vice versa. These operations can be readily performed by the foot of the driver acting upon that part of the tongue $w$ which projects beyond the side of the rack $h$, and then by elevating or depressing the frame A, by means of the standard $z$, with the hand.

Claims.

What I claim as my invention, and desire to secure by Letters Patent, is—

1. The tedder-reel, having the expanding and folding bars L L', substantially as shown and described.

2. The disks I, provided with the stops $m$, in combination with the arms $l$, substantially as shown and described.

3. The self-bracing teeth S $r$ made of one piece of material, curled around the bars L L', and passing alternately over and under the tedder-axle, substantially as shown and set forth.

4. The combination of the expanding and folding tedder-reel and rake, substantially as shown and described.

5. The lever X, provided with the springs $q$ and $t$, in combination with the standard $z$ and rake-head P, as and for the purposes shown and described.

6. The hinged lever X, in combination with the spring $x$ as a lifting-lever for the rake, as shown and described.

In testimony that I claim the foregoing invention of improvements in horse hay-rakes and tedders, as above described, I have hereunto set my hand and seal.

ROBERT H. RUSSELL. [L. S.]

Witnesses:
    D. G. BRINTON,
    H. E. SEALEY.